United States Patent [19]
Fisher et al.

[11] Patent Number: 6,111,331
[45] Date of Patent: Aug. 29, 2000

[54] AIR SWITCH ASSEMBLY FOR AN ELECTRIC MOTOR

[75] Inventors: L. E. Fisher; Marc D. Pape; James V. Yu, all of Ft. Wayne, Ind.

[73] Assignee: General Electric Company, Schenectady, N.Y.

[21] Appl. No.: 09/274,446

[22] Filed: Mar. 22, 1999

[51] Int. Cl.$^7$ .............. H02K 11/00; H01H 9/00; H01H 35/24

[52] U.S. Cl. ............ 310/68 A; 310/68 E; 200/1 B; 200/81.4; 200/50.1

[58] Field of Search ............... 310/68 A, 68 E, 310/68 B, 67 R, 66; 200/1 B, 332.1, 47, 81 R, 81.4, 50.37, 50.31, 50.1, 61.62, 82 R, 5 R, 16 B, 509, 510, 524, 531, 536, 18, 39 R, 40, 51.04

[56] References Cited

U.S. PATENT DOCUMENTS

| | | | |
|---|---|---|---|
| 3,293,388 | 12/1966 | Slonnerger | 200/67 |
| 3,582,592 | 6/1971 | Schadow | 200/524 |
| 3,790,730 | 2/1974 | Wyland | 200/1 B |
| 3,889,088 | 6/1975 | Zdanys et al. | 200/330 |
| 4,133,992 | 1/1979 | Walker et al. | 200/81 R |
| 4,531,026 | 7/1985 | Terajima et al. | 200/5 R |
| 4,593,163 | 6/1986 | Fisher | 200/80 R |
| 4,663,505 | 5/1987 | Drake | 219/722 |
| 4,716,326 | 12/1987 | Fisher | 310/89 |
| 4,745,250 | 5/1988 | Mayo | 219/722 |
| 4,764,648 | 8/1988 | Resh | 200/50.1 |
| 4,791,329 | 12/1988 | Ubukata et al. | 310/68 C |
| 4,947,068 | 8/1990 | Howard et al. | 310/71 |
| 5,793,131 | 8/1998 | Fisher et al. | 310/68 A |

*Primary Examiner*—Nicholas Ponomarenko
*Assistant Examiner*—Dang Dinh Le
*Attorney, Agent, or Firm*—Carl B. Horton, Esq.; Damian Wasserbauer, Esq.; Armstrong Teasdale LLP

[57] ABSTRACT

An air switch assembly for an electric motor including a first snap action switch, a second snap action switch, and an actuator, is described. The first snap action switch is connected to the motor start winding and the second snap action switch is connected to the run winding. An actuator is positioned within the air switch assembly such that the air switch energizes the start winding, energizes the run winding, and de-energizes the start winding while maintaining the run winding energized when the actuator is actuated from an initial position to a final position.

21 Claims, 7 Drawing Sheets

AIR SWITCH ASSEMBLY FOR AN ELECTRIC MOTOR

BACKGROUND OF THE INVENTION

This invention relates generally to electric motors and, more particularly, to controlling energization of electric motor windings for jetted bath tub and other user attended applications.

Known jetted bath tubs include a pump having a pump motor. The pump motor typically is an electric AC motor having start and run windings. Energization of the motor windings is controlled, at least in part, by an operator actuated control switch and a centrifugal switch. The operator actuated control switch for jetted bath tub applications typically is an air switch. The centrifugal switch controls cut-out of the motor start winding based on rotor speed during motor start-up.

One known air switch used in jetted tub applications is a "push to start, push to stop" type air switch. The known air switch includes a normally open snap action switch and a spring-biased actuator. The snap action switch is electrically connected in series with a power line and the common connection of the pump motor start and run windings. The snap action switch includes a movable, spring-biased button which extends from the snap action switch housing. The button is normally biased to be in a fully extended condition, and when the button is fully extended, the snap action switch is in an open state. When the button is fully depressed inward towards the housing, the snap action switch is in a closed state.

The spring-biased actuator includes an actuating arm movable from and between first and second positions. In the first position, the actuating arm does not contact the snap action switch button. In the second position, the actuating arm is in contact with, and fully depresses, the snap action switch button. The actuator is biased so that the actuator arm is normally in the first position.

The above described jetted bath tub pump motor application is referred to as a "user attended" application since the user has direct control over motor energization. There are many other "user attended" applications in addition to the jetted bath tub pump motor application. Although the above described motor has proven reliable and satisfactory, it would be desirable to reduce the cost of such motor, in terms of both component cost and assembly cost.

Accordingly, it would be desirable and advantageous to provide a low cost motor for jetted tub and other user attended applications. It would also be desirable and advantageous to provide such a low cost motor which is as reliable and safe as existing motors for user attended applications. It would further be desirable to eliminate the centrifugal switch for controlling energization of the motor start winding without adversely affecting motor operation.

BRIEF SUMMARY OF THE INVENTION

These and other objects may be attained by an air switch assembly that provides control of energization and de-energization of motor windings, including a start winding, during motor start-up.

In one embodiment, the air switch assembly includes an actuator, a first switch and a second switch. The first and second switches each control energization of at least one motor winding. More particularly, the first switch controls energization and de-energization of the start winding and the second switch controls energization and de-energization of the run windings.

The switches are in series relationship between the power supply and the start or run windings. The switches are actuated by an actuator that is positioned at least partially within a motor shell.

In operation, the actuator contacts the first switch to place the switch in an "ON" state. The actuator then contacts the second switch and places the second switch in the "ON" state. The actuator then loses contact with the first switch which places the first switch in the "OFF" state. Then, the actuator loses contact with the second switch which places the second switch in the "OFF" state.

The air switch assembly is mounted within, and connected to, the motor shell to protect the assembly from contaminants and also to reduce the fabrication costs. The air switch assembly is held in place on the motor shell with a threaded boss and a nut. The nut includes a locking mechanism to prevent the air switch from becoming disconnected and dropping into the motor.

The utilization of two switches operated from a single actuator reduces the fabrication costs of the switch assembly, and thus the motor. In addition, the complexity of the air switch assembly is reduced since a centrifugal switch is no longer required.

DETAILED DESCRIPTION OF THE INVENTION

Figure 1:
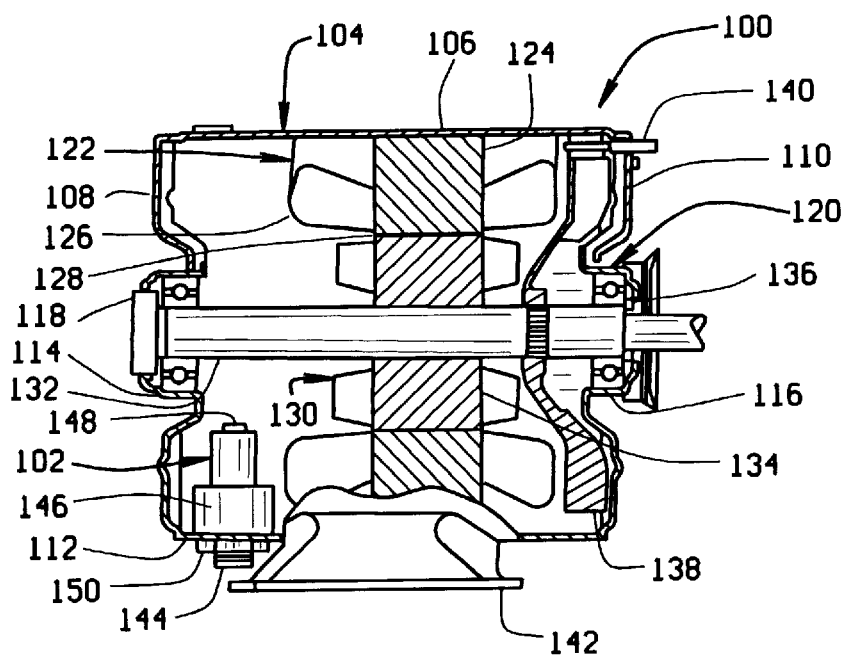
FIG. 1 is a partial cross section view, with parts cut-away, of an electric motor incorporating an air switch assembly in accordance with one embodiment of the present invention.

FIG. 1 is a partial cross section view, with parts cut-away, of an electric motor 100 incorporating an air switch assembly 102 in accordance with one embodiment of the present invention. Motor 100 includes a housing 104 formed by a motor shell 106 and motor end shields 108 and 110. Motor shell 106 has an opening 112 therein. Motor end shields 108 and 110 include a first support 114 and a second support 116 for a first bearing assembly 118 and a second bearing assembly 120, respectively.

A stator 122, including a stator core 124 having start and run windings 126, is mounted within motor shell 106. Stator core 124 forms a stator bore 128. A rotor 130 having a rotor shaft 132 is concentrically arranged with respect to stator core 124. Rotor 130 also includes a rotor core 134 positioned concentrically with, and attached to, rotor shaft 132. Rotor shaft 132 is coaxially aligned with bearing assemblies 118 and 120 and extends through an opening 136 in end shield 110.

A fan 138 is secured to, and rotates with, rotor shaft 132. End shields 108 and 110 are secured to shell 106 by a plurality of threaded bolts 140 which are inserted through aligned openings in end shields 108 and 110 and stator core 124. Motor 100 also includes a base 142 for support and mounting.

Air switch assembly 102 includes a boss 144, a housing 146, a first switch (not shown) and a second switch (not shown). Electric contacts 148 (only one contact 148 is visible in FIG. 1) are positioned through housing 146, with two contacts 148 coupled to a power line (not shown), one contact 148 coupled to a common connection of motor start and run windings 126, and one contact 148 coupled to motor start winding 126. Air switch housing 146 is positioned within motor shell 106, and air switch boss 144 extends from air switch housing 146 through motor shell opening 112. Air switch boss 144 is threaded, and a nut 150 is threadedly engaged with boss 144, tightened against shell 106, and locked in place.

In the embodiment shown in FIG. 1, air switch assembly 102 is preferably a "push to start, push to stop" type switch. More specifically, air switch 102 includes the first snap action switch and the second snap action switch which are normally biased in the open condition. A spring-biased actuator (not shown) is positioned within housing 146 to contact the snap action switches when the actuator is actuated. The snap action switches are electrically connected in series with the motor power line and the motor windings 126 via contacts 148 as described above. The snap action switches each include a contact button biased by a spring or other suitable biasing element (not shown) which extends from the snap action switch housing. The button is normally biased to be in a fully extended condition, and when the button is fully extended, the snap action switch is in an open state. When the button is fully depressed inward towards the snap action switch housing, the snap action switch is in a closed state and energy is delivered to the respective motor windings 126 through the motor power line. When the snap action switch button is no longer depressed, the snap action switch opens and the respective motor windings are de-energized.

Air switch assembly 102 also includes an operator controlled air transmitter (not shown) in flow communication with an air bellows located within housing 146. Specifically, one end of a tube (not shown) is engaged to boss 144 and the other end of the tube is engaged to the output of the air transmitter. As will be readily understood by one skilled in the art, the transmitter includes a user depressible flexible diaphragm, and when an operator presses against, and deforms, the flexible diaphragm, a pulse of air is communicated from the air transmitter, through the tube, and to the air bellows. The air bellows expands and acts against the actuator, which causes the actuator to move. In a jetted tub application, the air transmitter typically is located near or integral with the tub so that an operator in or next to the tub can depress the flexible diaphragm to initiate or stop pump operation.

The above described jetted bath tub pump motor application is referred to as a "user attended" application since the user has direct control over motor energization. It will be appreciated that there are many other "user attended" applications in addition to the jetted bath tub pump motor application in which motor 100 can be used.

Motor 100 provides an important advantage over known electric motors in that air switch assembly 102 is substantially secured within motor shell 106 and no additional removable cover is required. In the past, the air switch has been secured to the motor in a removable cover. Elimination of the removable over facilitates reducing the motor material and assembly costs.

Figure 2:
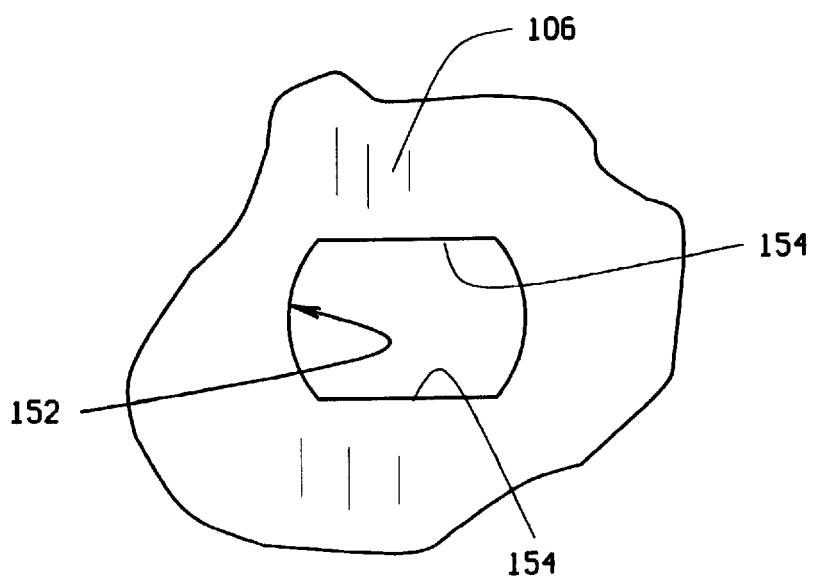
FIG. 2 is a top view of a repunch opening in the motor shell for the air switch assembly shown in FIG. 1.

FIG. 2 is a top view of an opening 152 in motor shell 106 through which air switch boss 144 extends as shown in FIG. 1. Air switch assembly 102 (shown in FIG. 1) is assembled into motor shell 106 at a late point in the assembly process. Motor shell 106 can thus be initially punched, using dies, to form indentations at a periphery of opening 152. Once the motors set to receive an air switch have been separated from, or at least selected from, other motors on the assembly line, each motor shell 106 of each motor 100 (shown in FIG. 1) to include air switch assembly 102 can be further punched at the location of the initial punch so that opening 152 is formed. Opening 152 includes anti-rotation flat portions 154 to facilitate preventing boss 144 (shown in FIG. 1) from rotating relative to shell 106.

Figure 3:
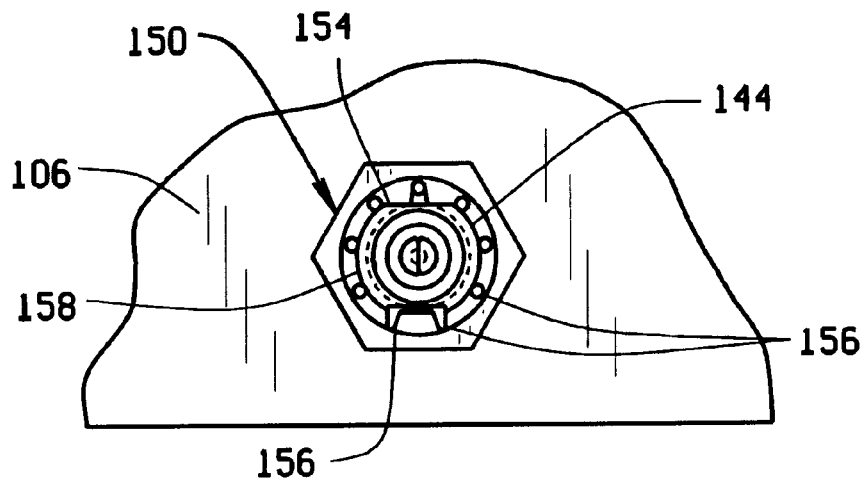
FIG. 3 is a schematic view of the air switch assembly shown in FIG. 1.

FIG. 3 is a schematic view of nut 150 attached to boss 144. Boss 144 extends through motor shell 106 and nut 150 is threadedly engaged with boss 144. In one embodiment, nut 150 is a standard single thread metal nut which includes a plurality of tabs 156 located around an inner periphery 158. At least one of tabs 156 is staked to flat portion 154 to lock nut 150 onto boss 144. Alternatively, other nut locking mechanisms could be used such as a lockwasher or bonding.

Figure 4:
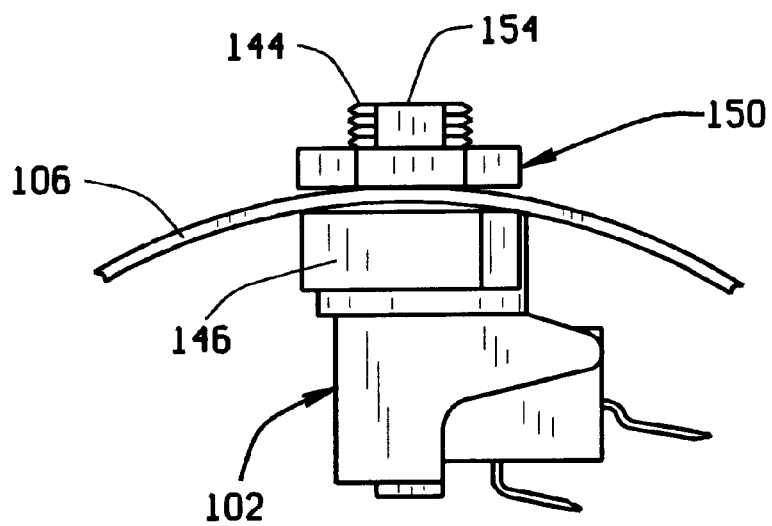
FIG. 4 is a schematic view of a top of the air switch assembly shown in FIG. 3.

FIG. 4 is a schematic view of air switch 102 connected to motor shell 106 via boss 144 and nut 150. As shown in FIG. 4, air switch housing 146 and the snap action switches (not shown in FIG. 4) are held against motor shell 106 by the interaction of threaded boss 144 and nut 150. Threaded boss 144 includes flat portions 154 to prevent rotation of air switch 102 in relation to motor shell 106. Flat portions 154 of threaded boss 144 also provide a locking mechanism for nut 150. The locking of nut 150 onto boss 144 prevents nut 150 from disengaging from boss 144 and dropping into motor 100 (shown in FIG. 1) which could require a complete motor teardown to repair.

Figure 5:
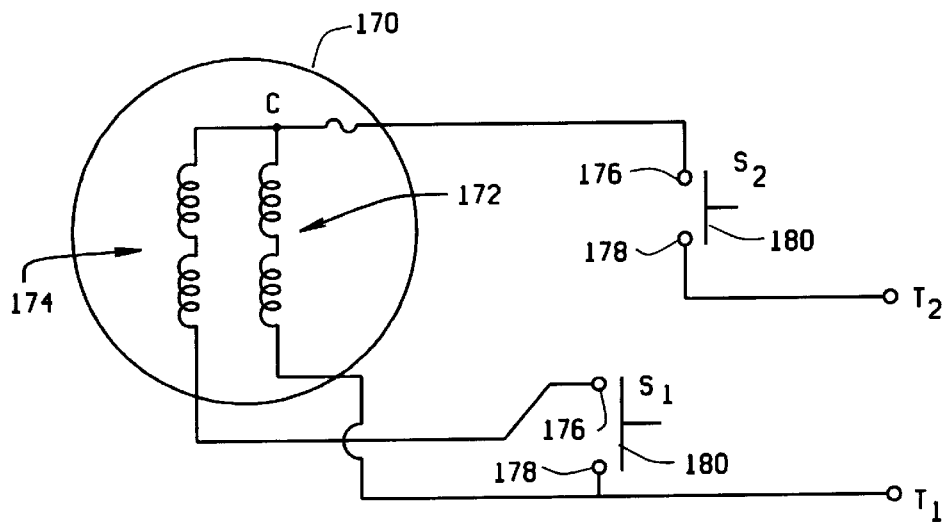
FIG. 5 is a circuit schematic diagram of the air switch assembly shown in FIG. 1.

FIG. 5 is a circuit schematic diagram of an electric motor 170, a first switch $S_1$ and a second switch $S_2$ arranged, i.e., electrically connected, in a manner which advantageously enables elimination of a centrifugal switch from electric motor 170. More specifically, motor 170 includes main, or run, winding 172 and start winding 174. Run winding 172 and start winding 174 are connected at a common connection "C". First switch $S_1$ is connected in series between a first power terminal $T_1$ and common connection C. Second switch $S_2$ is connected in series between start winding 174 and a second power terminal $T_2$. First and second switches $S_1$ and $S_2$ each include first and second contacts 176 and 178, and a conducting bar 180.

First switch $S_1$ has a first, non-conducting condition in which its conducting bar 180 is not in circuit with its first and second contacts 176 and 178, as shown in FIG. 5. First switch $S_1$ also has a second, conducting condition in which its conducting bar 180 is in circuit with its first and second contacts 176 and 178. Second switch $S_2$ also has a first, non-conducting condition and a second conducting condition as described above with reference to first switch $S_1$.

During motor start up, first switch $S_1$ is controlled or actuated to transition from the first, non-conducting condition to the second conducting condition. Therefore, start windings 174 will energize as soon as $S_2$ switch transitions. Shortly thereafter, second switch $S_2$ is controlled or actuated to transition from the first, non-conducting condition to the second conducting condition. The conducting condition energizes both start and run windings 172, 174.

Once the motor rotor has developed sufficient starting torque, first switch $S_1$ is controlled to transition from the second conducting condition to the first, non-conducting condition. Start winding 174 is then de-energized, or cut-out, and motor 170 operates with run winding 172 energized.

To turn motor 170 off, second switch $S_2$ is transitioned from the second, conducting condition to the first, non-conducting condition. Therefore, run winding 172 also is de-energized. Importantly, run winding 172 is de-energized without having to energize start winding 174.

Figure 6:
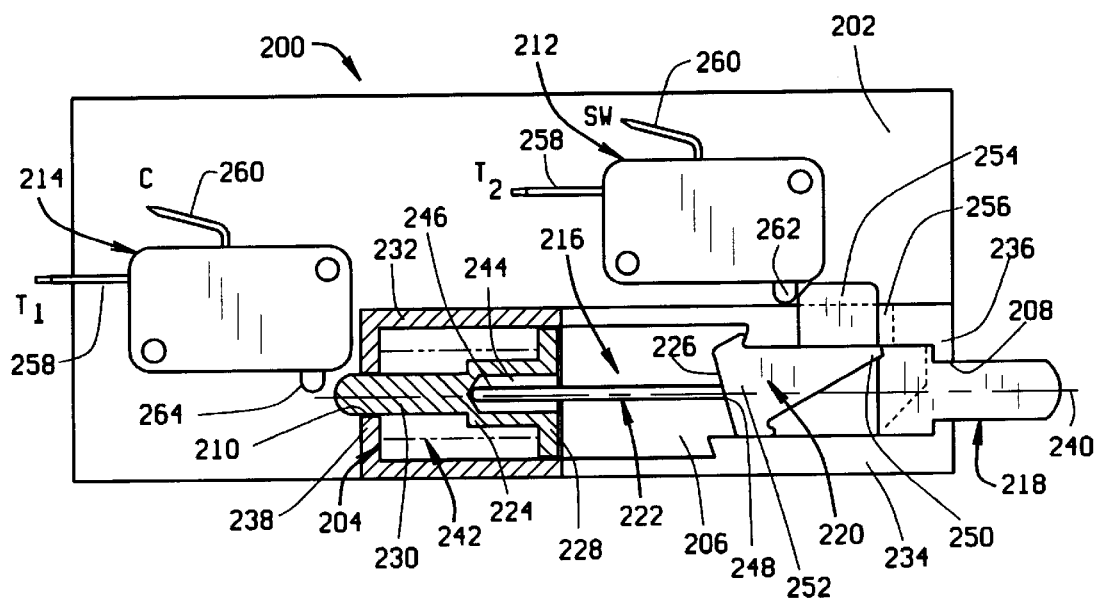
FIG. 6 is a schematic view of the air switch assembly shown in FIG. 1 with an actuator in a first position.

FIG. 6 is a schematic view of an exemplary air switch assembly 200 that provides the switching operation described above in connection with FIG. 5. Air switch assembly 200 includes a base 202, a housing 204 mounted to base 202 and including a chamber 206. A first opening 208 and a second opening 210 extend through housing 204 and are in communication with chamber 206.

A first snap action switch 212 and a second snap action switch 214 are connected to base 202. First switch 212 corresponds to first switch $S_1$ (FIG. 5), and second switch 214 corresponds to second switch $S_2$ (FIG. 5). Switch assembly 200 also includes an actuator 216 movable relative to, and between, first snap action switch 212 and second snap action switch 214.

Actuator 216 is positioned at least partially within housing chamber 206. FIG. 6 shows actuator 216 in a first, or initial, position. Actuator 216 includes a first plunger 218 extending at least partially through housing opening 208. First plunger 218 is in abutting relationship with an actuating member 220. First plunger 218 and actuating member 220 are not fixedly connected, but instead are held in contact by a spring force, as will be described below in greater detail.

A connecting rod 222 extends between actuating member 220 and a second plunger 224. Connecting rod 222 is not fixedly connected to actuating member 220. Instead, connecting rod 222 is partially positioned within an opening 226 of actuating member 220. Second plunger 224 includes a base portion 228 and an extension portion 230. Extension portion 230 extends at least partially through housing opening 210.

Housing 204 further includes a first side wall 232, a second side wall 234, a first end wall 236, a second end wall 238, and a top (not shown). Second housing opening 210 is located through second end wall 238 and first housing opening 208 is located through first end wall 236. Base portion 228 extends from first side wall 232 to second side wall 234 and from switch assembly base 202 to the housing top. Base portion 228 prevents second plunger 224 from moving other than along an axis 240 of actuator 216.

A spring 242 is positioned between second end wall 238 and second plunger base 228. Spring 242 biases second plunger 224 into contact with connecting rod 222, and biases connecting rod 222 into contact with actuating member 220. Base portion 228 further includes an opening 244 into which first end 246 of connecting rod 222 extends. The force of spring 240 maintains first end 246 of connecting rod 222 in contact with second plunger 224 and maintains a second end 248 of connecting rod 222 in contact with actuating member 220. Connecting rod 222 has a pivoting relationship with actuating member 220 which permits connecting rod 222 to move with respect to first plunger 218 and second plunger 224. Alternatively, actuating member 220 could be pivotally connected to connecting rod 222 such as with a pin.

Actuating member 220 has a substantial "V" shape, i.e., a wedge shape, with a narrow end 250 in contact with first plunger 218 and a broad end 252 in contact with connecting rod 222. Opening 226 is located at an approximate center of broad end 248 and connecting rod second end 248 is positioned within opening 226. Actuating member 220 includes an extension member 254 extending toward first side wall 232 which includes a slot 256 to accommodate extension member 254. Slot 256 permits extension member 254 to extend through slot 256 when narrow end 250 of actuating member 220 is adjacent first side wall 232.

First and second snap action switches 212 and 214 each include a first blade terminal 258 and a second blade terminal 260. First blade terminal 258 of first snap action switch 212 is electrically coupled to a first motor power terminal $T_1$, and second blade terminal 260 of first snap action switch 212 is electrically coupled to common connection C between the motor run and start windings. First blade terminal 258 of second snap action switch 214 is electrically coupled to a second motor power terminal $T_2$, and second blade terminal 260 of second snap action switch 214 is electrically coupled to motor start winding SW. Snap action switch 212 corresponds to switch $S_1$ (FIG. 5) and snap action switch 214 corresponds to switch $S_2$ (FIG. 5).

First and second snap action switches 212 and 214 include movable, mechanically-biased (e.g., spring-biased) buttons 262 and 264, respectively, normally biased to be in a fully extended condition. When first switch button 262 is fully extended, first switch 212 is in an open, non-conducting, or "OFF", state. When first switch button 262 is fully depressed, first switch 212 is in a closed, conducting, or "ON", state. Similarly, when second switch button 264 is fully extended, second switch 214 is in an open, non-conducting, or "OFF", state. And, when second switch button 264 is fully depressed, second switch 214 is in a closed, conducting, or "ON", state. Air switch assembly 200 shown in FIG. 6 is in an OFF state since first snap action switch contact button 262 and second snap action switch contact button 264 are in a fully extended state.

Figure 7:
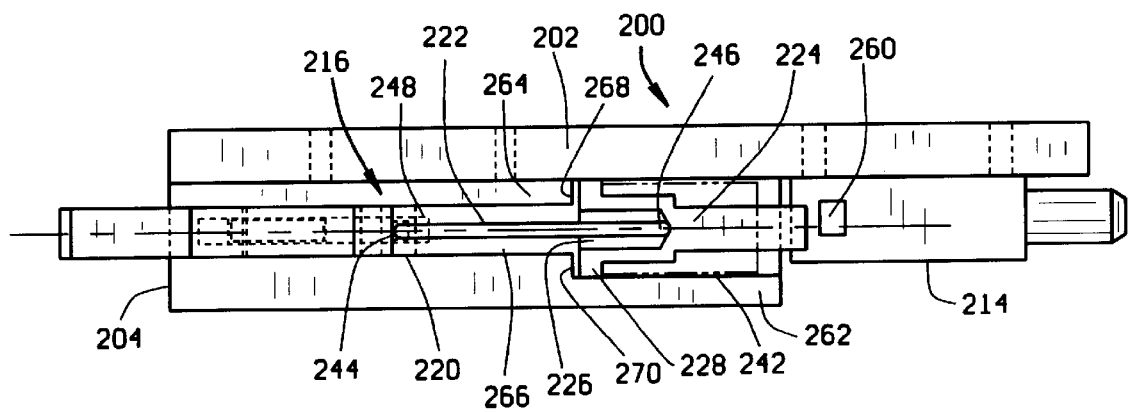
FIG. 7 is a schematic view of a top cut-away of the air switch assembly shown in FIG. 6.

FIG. 7 is a schematic top cut-away view of air switch assembly 200. Snap action switch 214 is in an OFF state since contact button 264 is in the fully extended position. Second plunger base portion 228 extends from base 202 to a top 266 of housing 204, and first end 246 of connecting rod 222 is positioned within opening 226 of second plunger 224. Opening 226 is larger than first end 246 of connecting rod 222 to allow connecting rod 222 to move with respect to second plunger 224. Second plunger base portion 228 is prevented from moving along axis 240 of actuator 216 by a first ledge 268 on base 202 and a second ledge 270 on top 266. Ledges 268 and 270 prevent second plunger 224 from losing contact with second opening 210, and thus maintain spring 242 in a compressed state throughout the actuating movement of actuator 216.

Second end 248 of connecting rod 222 is positioned within opening 244 of actuating member 220. Connecting rod 222 maintains contact with actuating member 220 due to the force exerted by spring 242. Opening 244 permits connecting rod to pivot with respect to actuating member 220.

Figure 8:
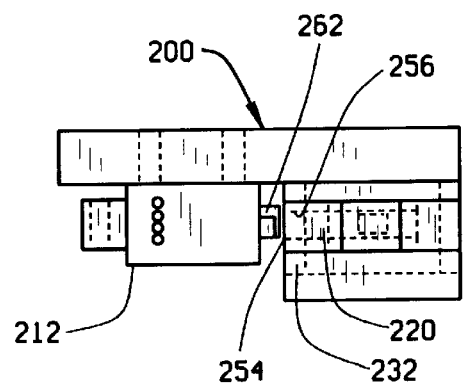
FIG. 8 is a schematic view of a front of the air switch assembly shown in FIG. 6.

FIG. 8 is a schematic view of a front of air switch assembly 200. Snap action switch 212 is in an OFF state since contact button 262 is in the fully extended position. Extension member 254 of actuating member 220 is approximately in a center of actuating member 220. Slot 256 through housing first side wall 232 is positioned so that it can receive extension member 254.

Figure 9:
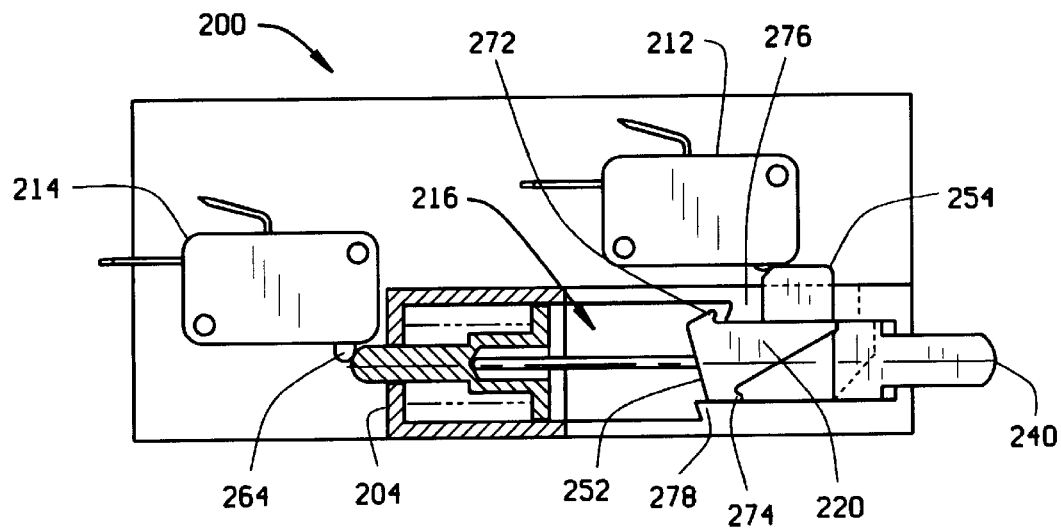
FIG. 9 is a schematic view of the air switch assembly shown in FIG. 6 with the actuator partially actuated.

FIG. 9 is a schematic view of air switch assembly 200 with actuator 216 partially actuated. Snap action switch 212 is in the ON state and snap action switch 214 is in the OFF state. Contact button 262 (shown in FIG. 6) of first snap action switch 212 is fully depressed by extension member 254 of actuating member 220.

As actuator 216 moves towards housing second end wall 238, actuator member 220 and extension member 254 also move towards housing second end wall 238 and extension member 254 depresses contact button 262. When contact button 262 is depressed, the start winding (not shown in FIG. 9) is energized. Run windings (not shown in FIG. 9) are not energized in FIG. 9 since contact button 264 is fully extended in this switch assembly position.

Actuating member 220 includes a first tab 272 and a second tab 274, and switch assembly housing 204 includes a third ledge 276 and a fourth ledge 278. First tab 272 contacts third ledge 276 and is in sliding engagement therewith. First tab 272 and third ledge 276 maintain actuating member broad end 252 in position and reduce the side-to-side movement by broad end 252 of actuating member 220.

Figure 10:
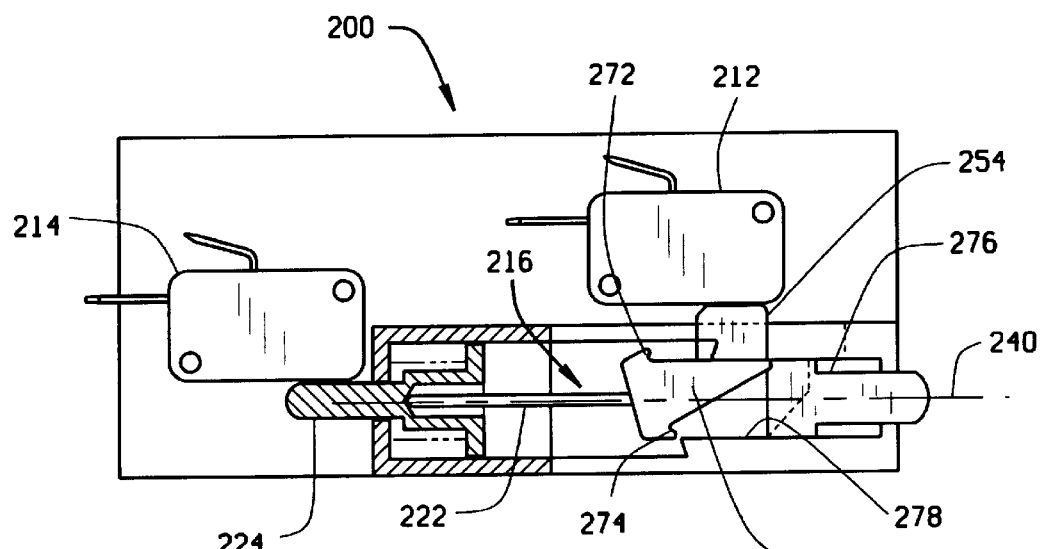
FIG. 10 is a schematic view of the air switch assembly shown in FIG. 6 with the actuator fully actuated to a second position.

FIG. 10 is a schematic view of air switch assembly 200 with actuator 216 fully actuated to a second position. In this position of actuator 216, snap action switch 212 is in the ON state and snap action switch 214 is also in the ON state. Contact button 262 (shown in FIG. 6) of first snap action switch 212 is fully depressed by extension member 254 of actuating member 220 and contact button 264 (shown in FIG. 6) of second snap action switch 214 is fully depressed by second plunger 224.

Second tab 274 is no longer in contact with fourth ledge 278 and connecting rod 222 is substantially aligned with actuator axis 240. The contact point between actuating member 220 and connecting rod 222 is also along actuator axis 240.

Figure 11:
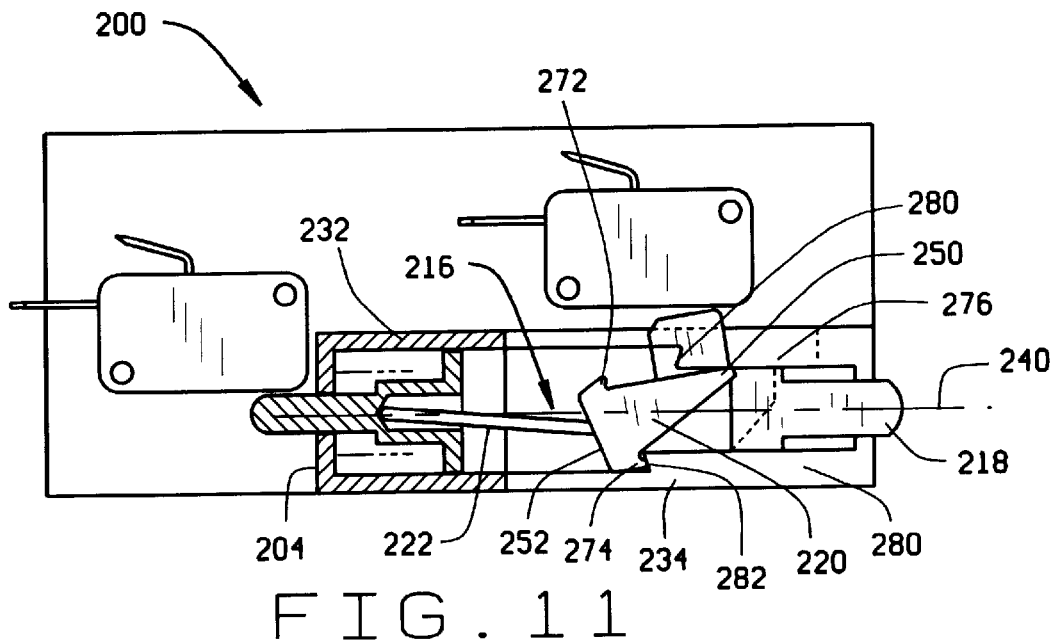
FIG. 11 is another schematic view of the air switch assembly shown in FIG. 6 with the actuator fully actuated to the second position.

FIG. 11 is a schematic view of air switch assembly 200 with actuator 216 fully actuated to the second position, after actuating member 220 has shifted. Actuating member broad end 252 has moved into contact with second side wall 234 of switch assembly housing 204. The contact point between connecting rod 222 and actuating member 220 has also shifted, such that it is no longer along actuator axis 240. Actuating member narrow end 250 remains unchanged as long as pressure continues to be applied to first plunger 218.

Third and fourth ledges 276, 278 of switch assembly housing 204 include a step 280, 282, respectively. Steps 280 and 282 are slanted, or angled, relative to first and second side walls 232, 234. First and second tabs 272, 274 of actuating member 220 are also slanted, or angled, to provide for a locking engagement with steps 280 and 282, respectively, of housing 204 when tabs 272, 274 contact steps 280, 282, respectively.

Figure 12:
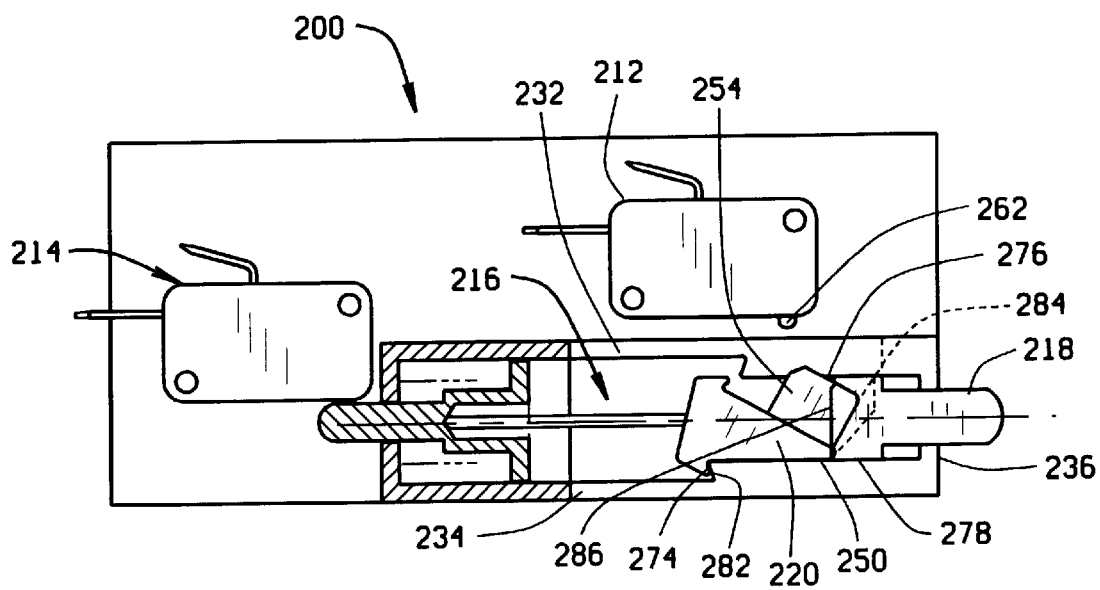
FIG. 12 is a schematic view of the air switch assembly shown in FIG. 6 after the actuator has moved to a final position.

FIG. 12 is a schematic view of air switch assembly 200 after pressure has been released from actuator 216 and actuator 216 has moved to a third, or final, position. Second tab 274 of actuating member 220 engages second step 282 of second side wall 234. The contact of second tab 274 with second step 282 prevents second tab 274 from moving towards first end wall 236. When pressure is released from first plunger 218, first plunger 218 moves toward first end wall 236. Since second tab 274 is prevented from moving towards first end wall 236, actuating member 220 rotates and narrow end 250 of actuating member 220 moves out of contact with third ledge 276 of first side wall 232 and into contact with fourth ledge 278 of second side wall 234.

Upon movement of narrow end 250, extension member 254 moves away from first snap action switch contact button 262 and snap action switch 212 transitions from the ON state to the OFF state. First plunger 218 includes a slot 284 that accommodates extension member 254 when extension member 254 is within housing 204. Slot 284 is located on a first end 286 of first plunger 218, which is within housing 204.

Contact button 264 (shown in FIG. 6) of snap action switch 214 is still depressed, and therefore snap action switch 214 is in the ON state after snap action switch 212 has transitioned to the OFF state. Thus, the run windings (not shown in FIG. 12) remain energized after the start windings (not shown in FIG. 12) are de-energized.

Actuator 216 travels from the first, initial position, to the second position, and then to the third position upon actuation and release of first plunger 218. During this actuation, first, the start windings become energized, then the run windings become energized, and finally the start windings become de-energized. The length of time the start windings remain energized is short. However, since the starting time of the motor is relatively short (approximately ¼ of a second), the start windings are energized for an appropriate length of time.

Figure 13:
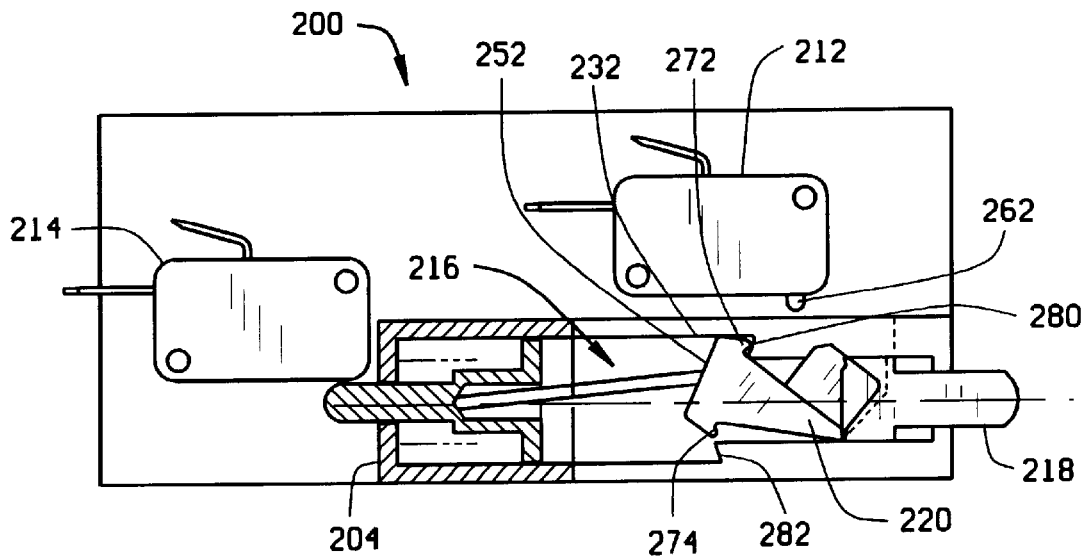
FIG. 13 is a schematic view of the air switch assembly shown in FIG. 6 as the actuator moves from the final position.

FIG. 13 is a schematic view of air switch assembly 200 after pressure has again been applied to actuator 216 through first plunger 218. When pressure is applied to first plunger 218, second tab 274 of actuating member 220 releases from second step 282 of housing 204 and actuating member broad end 252 moves so that first tab 272 contacts first side wall 232 and first step 280.

Contact button 262 of first snap action switch 212 is fully extended and therefore first snap action switch 212 is in the OFF state. Contact button 264 (shown in FIG. 6) of second snap action switch 214 is fully depressed and therefore second snap action switch 214 remains in the ON state.

Figure 14:
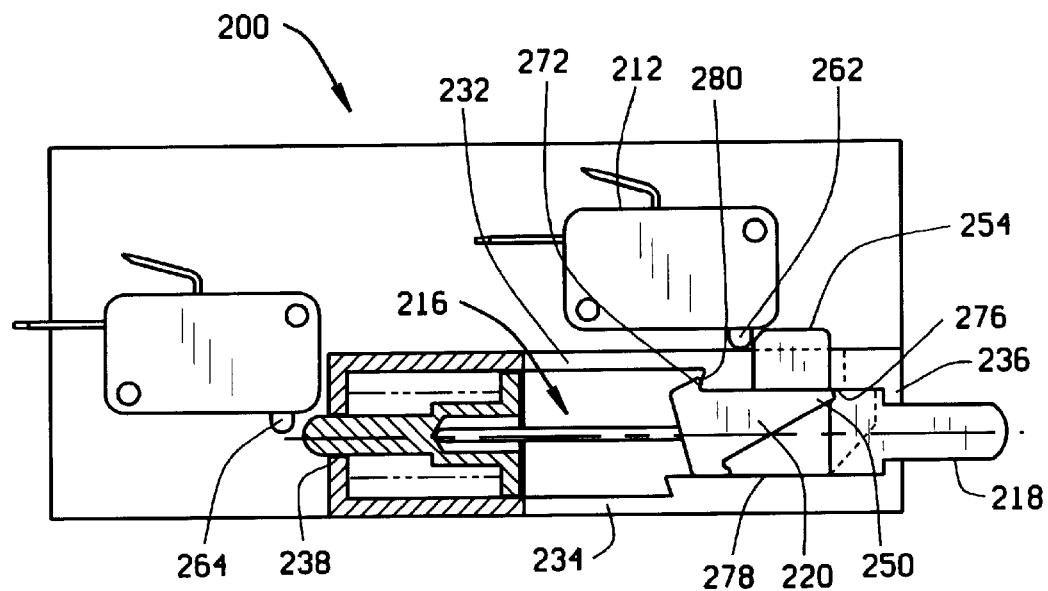
FIG. 14 is a schematic view of the air switch assembly shown in FIG. 6 after the actuator has again moved to the initial position.

FIG. 14 is a schematic view of air switch assembly 200 after pressure has been released from actuator 216. When pressure is released from first plunger 218, actuator 216 comes to rest in the initial position, as shown in FIG. 14, and first plunger 218 moves away from second end wall 238. First tab 272 of actuating member 220 engages first step 280 of first side wall 232. The contact of first tab 272 with first step 280 prevents first tab 272 from moving towards first end wall 236. Since first tab 272 is prevented from moving towards first end wall 236, actuating member 220 rotates and narrow end 250 of actuating member 220 moves out of contact with fourth ledge 278 of second side wall 234 and into contact with third ledge 276 of first side wall 232.

Upon movement of narrow end 250 towards third ledge 276, extension member 254 moves toward first snap action switch contact button 262. Snap action switch 212 remains in the OFF state since first snap action switch contact button 262 remains in the fully extended position. In addition, second snap action switch 214 transitions from the ON state to the OFF state when actuator 216, and second plunger 224, move to the first position, and out of contact with second snap action switch contact button 264.

A method for assembling electric motor 100 (shown in FIG. 1) includes the steps of inserting stator 122 (shown in FIG. 1) within motor shell 106 (shown in FIG. 1). Rotor core 134 (shown in FIG. 1) is then positioned within bore 128 (shown in FIG. 1) of stator 122.

Air switch assembly 200 is placed within motor shell 106 and connected to the start winding and the run winding so that air switch assembly 200 energizes the start winding, then energizes the run winding, and then de-energizes the start winding while maintaining the run winding energized when actuator 216 is actuated from an initial position to a final position.

Air switch assembly boss 144 (shown in FIG. 1) is inserted through motor shell opening 152 so that boss 144 extends from motor shell 106. Nut 150 (shown in Fire 1) is threaded onto threaded boss 144 and then locked in the threaded position by staking nut 150 to substantially flat side 154 (shown in FIG. 1) of threaded boss 144.

Actuator 216 is positioned at least partially within air switch assembly housing 204. First snap action switch 212 and second snap action switch 214 are positioned so that actuator 216 contacts first snap action switch 212, then contacts second snap action switch 214, and then loses contact with first snap action switch 212 while maintaining contact with second snap action switch 214 when actuator 216 is actuated from the initial position to the final position.

The actuator is assembled within housing 204 by positioning actuating member 220 in contact with first plunger 218, and positioning first end 248 of connecting rod 222 in contact with actuating member 220. Second end 246 of connecting rod 222 is then positioned in contact with second plunger 224. Spring 242 is positioned between second plunger 224 and housing 204 to allow spring 242 to bias second plunger 224 toward first plunger 218. Actuating member 220 is positioned so that first tab 272 mates with first step 280 when actuator 216 is in the initial position and second tab 274 mates with second step 282 when actuator 216 is in the final position.

First and second plungers 218, 224, actuating member 220, and connecting rod 222 of actuator 216 can be molded using, for example, any suitable thermoplastic material. Suitable snap action switches are commercially available from Micro Switch, a Honeywell Division, 11 W. Spring Street, Freeport, Ill. 61032, and suitable air transmitters, including air bellows, are commercially available from Tridelta Industries, Inc., 7350 Corporate Blvd., Mentor, Ohio 44060-4856.

Air switch assembly 200 provides the important advantage that the motor centrifugal switch can be eliminated. Therefore, the cost of a motor incorporating the features of the present invention, in terms of both component cost and assembly cost, is believed to be reduced by using air switch assembly 200.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, the actuation could be manual and not by an air switch. In addition, other actuators could be utilized that have a similar function of alternately controlling the two snap action switches as described above and thus are covered by the appended claims. Accordingly, the spirit and scope of the invention are to be limited only by the terms of the appended claims.

What is claimed is:

1. An air switch assembly for an electric motor, said switch assembly comprising:
   a base;
   a housing mounted to said base, said housing comprising a chamber;
   a first switch connected to said base;
   a second switch connected to said base; and
   an actuator positioned at least partially within said housing chamber, said actuator configured for slidable movement to contact said first switch, slidable movement to contact said second switch, and pivotal movement to lose contact with said first switch while maintaining contact with said second switch when said actuator is actuated from an initial position to a final position.

2. An air switch assembly in accordance with claim 1 wherein said actuator comprises:
   a first plunger;
   a second plunger;
   a rod connecting said first plunger to said second plunger; and
   a spring positioned between said second plunger and said housing, said spring biasing said second plunger toward said first plunger.

3. An air switch assembly in accordance with claim 2 wherein said second plunger comprises an opening for receiving at least a portion of said rod.

4. An air switch assembly in accordance with claim 2 wherein said actuator further comprises an actuating member connecting said rod to said first plunger, said actuating member moveable with respect to said first plunger and said rod.

5. An air switch assembly in accordance with claim 4 wherein said housing further comprises a first side wall including a first step and a second side wall including a second step, said actuating member comprises a first tab and a second tab, said first tab configured to engage said first step and said second tab configured to engage said second step.

6. An air switch assembly in accordance with claim 5 wherein said actuating member comprises a broad end and a narrow end, said narrow end moveable within said housing between said first side wall and said second side wall, wherein said extension member extends through said slot when said narrow end is adjacent said first side wall.

7. An air switch assembly in accordance with claim 5 wherein said housing further comprises a first end wall and a second end wall, said first step closer to said first end wall than is said second step.

8. An air switch assembly in accordance with claim 4 wherein said actuating member has a substantial wedge shape.

9. An air switch assembly in accordance with claim 4 wherein said actuating member further comprises an extension member and said housing further comprises a slot, said extension member configured to extend through said slot to contact said first switch when said actuator is moved from said initial position to said final position.

10. An air switch assembly in accordance with claim 4 wherein said actuating member includes a first side a second side, a first tab, and a second tab, said first tab and said extension member extending from said first side and said second tab extending from said second side.

11. An air switch assembly in accordance with claim 2 wherein said housing further comprises a first opening and a second opening, said openings in communication with said housing chamber, said first plunger extending through said first opening, and said second plunger extending through said second opening, said second plunger configured to contact said second switch when said actuator is actuated from said initial position to said final position.

12. An air switch assembly in accordance with claim 11 wherein said second plunger is configured to lose contact with said second switch when said actuator is actuated from said final position to said initial position.

13. An air switch assembly in accordance with claim 1 wherein said switches are configured to be in an ON state only when contacted by said actuator.

14. An air switch assembly in accordance with claim 1 wherein said switches each include contact buttons configured to be depressed by said actuator.

15. An electric motor comprising:
   a stator comprising a stator core including a start winding and a run winding, said stator core further including a stator bore;
   a rotor comprising a rotor shaft concentrically arranged with respect to said stator core and a rotor core positioned concentrically with said rotor shaft and attached thereto;
   a motor shell comprising an opening therein, said stator core and said rotor core positioned within said motor shell; and
   an air switch assembly comprising a boss, a housing, an actuator, a first switch, and a second switch, said air switch housing positioned within said motor shell, said air switch boss connected to said air switch housing and extending through said motor shell opening, said first switch electrically coupled to said start winding and said second switch electrically coupled to said run winding, wherein said actuator is configured to slidably engage said first switch to energize said start winding, slidably engage said second switch to energize said run winding, and pivotally disengage said first switch to de-energize said start winding while maintaining said run winding energized when said actuator is actuated from an initial position to a final position.

16. An electric motor in accordance with claim 15 wherein said first and second switches each comprise a first terminal and a second terminal, said first terminal of said first switch electrically coupled to said start winding, said second terminal of said first switch electrically coupled to a first motor power terminal, said first terminal of said second switch electrically coupled to a second motor power terminal, and said second terminal of said second switch electrically coupled to a common connection between said run winding and said start winding.

17. An electric motor in accordance with claim 15 wherein said actuator comprises:
   a first plunger;
   a second plunger;
   a rod connecting said first plunger to said second plunger and moveable with respect to said first plunger and said second plunger; and
   a spring positioned between said second plunger and said housing, said spring biasing said second plunger toward said first plunger.

18. An electric motor in accordance with claim 17 wherein said actuator further comprises an actuating member connecting said rod to said first plunger, said actuating member moveable with respect to said first plunger.

19. An electric motor in accordance with claim 18 wherein said housing further comprises a first side wall including a first step and a second side wall including a second step, said actuating member comprises a first tab and a second tab, said first tab configured to contact said first step and said second tab configured to contact said second step.

20. An electric motor in accordance with claim 17 wherein said air switch boss is threaded and includes at least one substantially flat side, said motor further comprises a nut configured to thread onto said threaded boss and lock onto said threaded boss.

21. An electric motor in accordance with claim 20 wherein said nut is configured to be staked to said substantially flat side of said nut.

* * * * *